Feb. 14, 1956 H. A. TOULMIN, JR 2,734,785
GLASS FIBER BEARING
Filed June 19, 1953 3 Sheets-Sheet 1

INVENTOR.
HARRY A. TOULMIN JR.
BY Toulmin & Toulmin
ATTORNEYS

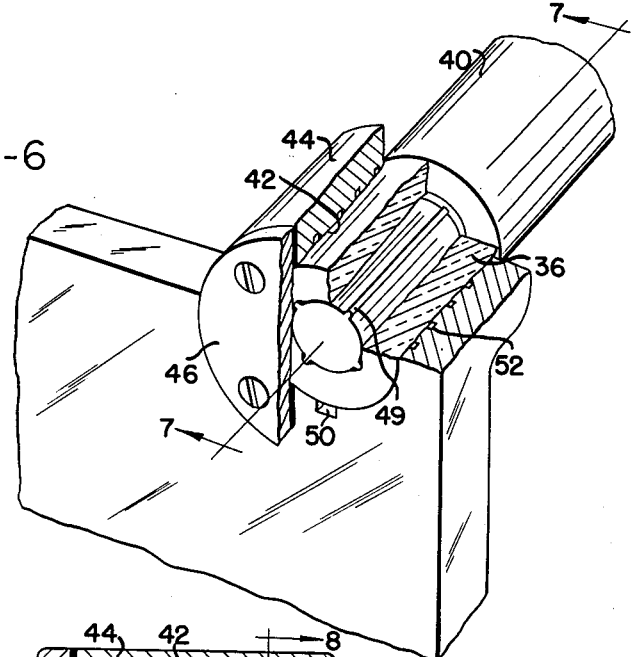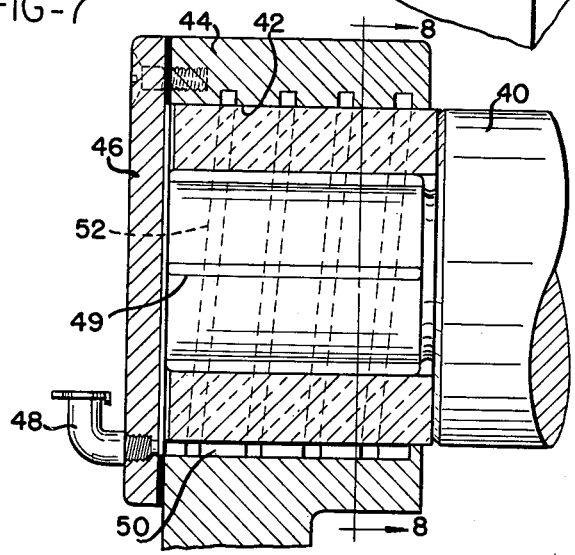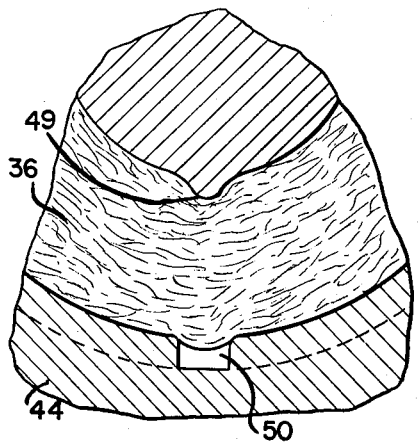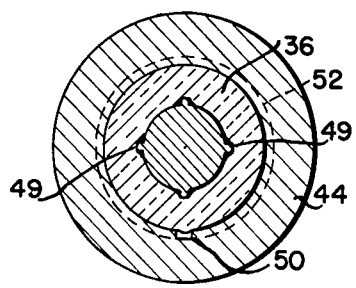

Feb. 14, 1956 H. A. TOULMIN, JR 2,734,785
GLASS FIBER BEARING
Filed June 19, 1953 3 Sheets-Sheet 3
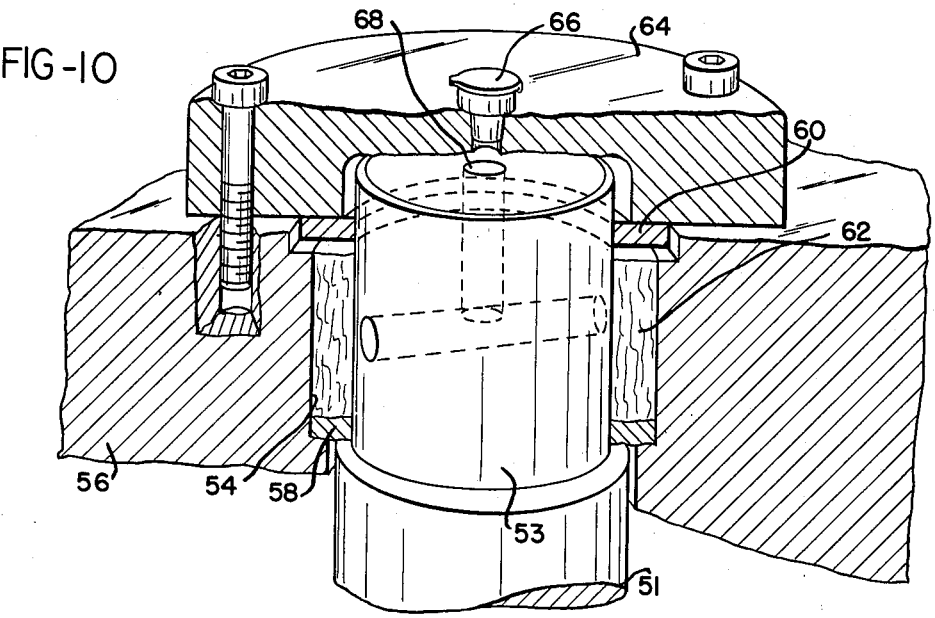
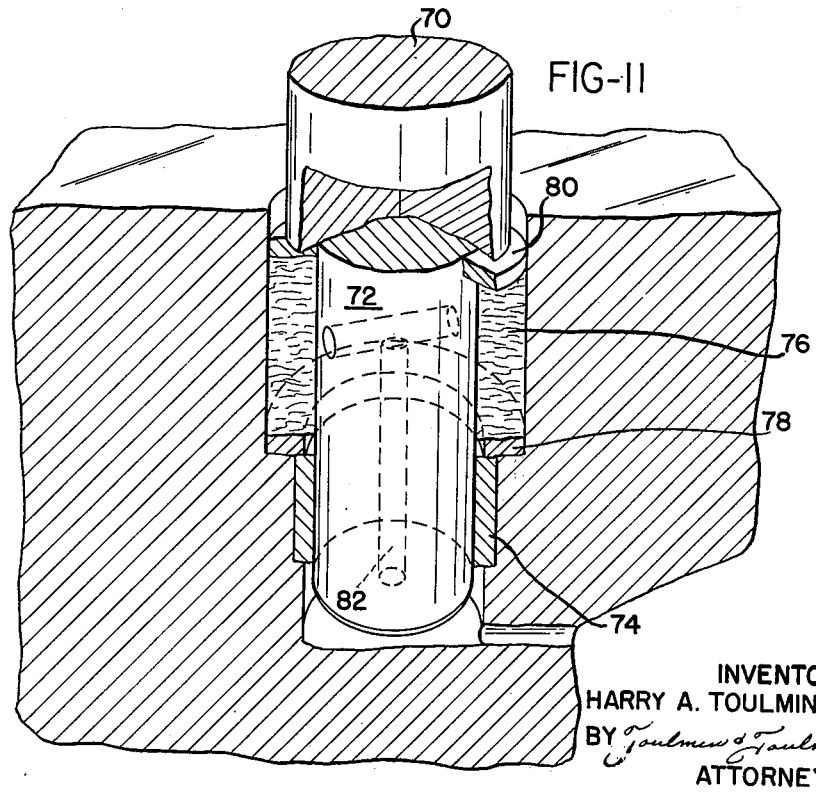
INVENTOR
HARRY A. TOULMIN JR.
BY *Toulmin & Toulmin*
ATTORNEYS United States Patent Office 2,734,785
Patented Feb. 14, 1956

2,734,785
GLASS FIBER BEARING

Harry A. Toulmin, Jr., Dayton, Ohio, assignor, by mesne assignments, to L. O. F. Glass Fibers Company, Toledo, Ohio, a corporation of Ohio Application June 19, 1953, Serial No. 362,917

20 Claims. (Cl. 308—121)

This invention relates to bearings for rotating members for sustaining both radial and axial loads thereon and relates, in particular, to bearing elements of this nature constructed of glass fibers.

In the art of journalling rotating members in machines and the like, it is highly important that adequate lubrication be supplied to the bearing surfaces and that the heat generated be conducted away rapidly enough to prevent overheating of the said surfaces, which overheating could lead to serious damage.

It has always been a problem to provide this proper journalling for members that rotated at high speed, or which were heavily loaded, or for bearings which were positioned in remote and inaccessible locations.

Having the foregoing in mind, it is an object of this invention to provide a bearing element for rotating work members which will overcome the difficulties referred to above.

Another object of this invention is the provision of a bearing element which will insure adequate and copious lubrication of the bearing surfaces at all times and under all conditions of operation.

A particular object of this invention is the provision of a bearing element for a rotating member which will insure that the bearing will be cool running at all times.

A particular object of this invention is the provision of a bearing element characterized in providing for resilient support of the member journalled thereby.

A still further object of this invention is the provision of a bearing element which is relatively inexpensive to manufacture and which will have long life.

Another object of this invention is the provision of a bearing element having an inherent pumping action during operation so that a lubricant or coolant will be automatically supplied to the bearing surface even when the lubricant supply is depleted or is at a distance from the bearing.

In brief, the objects of this invention, identified above, as well as still other objects, are attained by availing of the novel characteristics of matted glass fibers.

In the issued patent to J. G. Bush, 2,600,843, patented June 17, 1952, there is disclosed and described a glass fiber article and a method of manufacture therefore, in which a fiber glass spring unit is provided, consisting of matted glass fibers of extreme fineness on the order of 0.00005 and 0.00025 inches in diameter. These fibers are matted together, preferably simultaneously with the drawing and attenuation thereof and are then bonded together by a suitable bonding agent, preferably a resinous material and under a predetermined pressure. The bonding agent bonds the glass fibers together at their points of contact.

Thereafter, the resiliency of the unit is stabilized by repetitive loading in the direction in which the load will be applied to the member in use. This repetitive loading serves to fracture the glass fibers which extend in the direction of the loading or at only a slight angle thereto, thus leaving in the member only those glass fibers in effective condition extending at a substantial angle to the direction of loading and up to right angles thereto.

It is a particular purpose of the present invention to form a glass bearing of the general nature of the element described above.

The several objects and advantages referred to above, as well as still other objects and advantages of this invention will become more apparent upon reference to the following specification taken in connection with the accompanying drawings in which:

Figure 6 is a view similar to Figure 1 but showing a modified construction;

Figure 7 is a longitudinal sectional view of the Figure 6 element and is indicated by line 7—7 on Figure 6;

Figure 8 is a sectional view indicated by line 8—8 on Figure 7;

Figure 9 is an enlarged fragmentary view partly in section showing a bearing element according to my invention applied to a vertical shaft; and Figure 10 is a perspective view partly in section showing a bearing element according to my invention applied to a vertical shaft; and Figure 11 is a perspective view partly in section showing the application of my invention to a thrust bearing for a rotary shaft.

Figure 1:
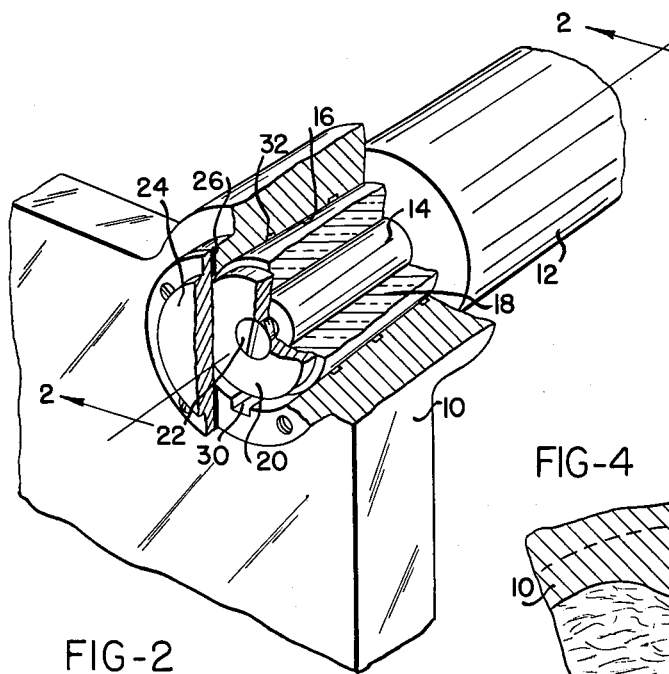
Figure 1 is a perspective view partly broken away showing a bearing element according to my invention for journalling a rotating member as to the radial thrusts thereon.

Referring to the drawings somewhat more in detail, in Figure 1, 10 indicates a stationary member such as the frame of a machine element, and 12 indicates a rotary member such as a shaft or roll to be journalled in the stationary member 10.

Member 12 is provided with a reduced diameter journal pin or shaft extension 14 which extends into a bore or bearing recess 16 formed in member 10. Disposed within bearing recess 16 and embracing shaft extension 14 is a fiber glass bearing element 18 according to my invention. Bearing element 18 is retained in position on shaft extension 14 so as to rotate therewith by end washer 20 that is secured to shaft extension 14 by screw 22.

The outer end of bearing recess 16 is preferably closed by a closure member 24 having a gasket 26 to prevent leakage of lubricant from the bearing recess. As will be seen in Figure 2, closure member 24 is provided with an oil cup 28 that communicates with axial groove 30 extending along the bottom of bearing recess 16.

Axial groove 30 is advantageously intersected by spiral groove 32 formed about the inner periphery of the bearing recess.

Figure 2:
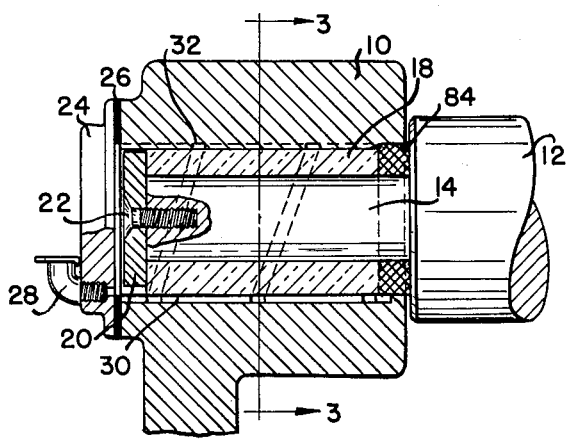
Figure 2 is a vertical sectional view of the Figure 1 element and is indicated by line 2—2 thereon.
Figure 3:
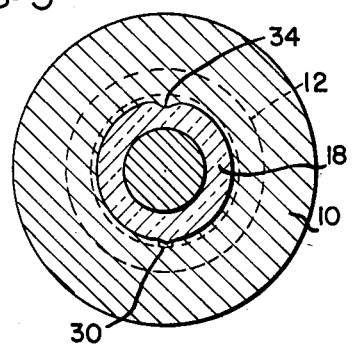
Figure 3 is a transverse section indicated by line 3—3 on Figure 2.
Figure 4:
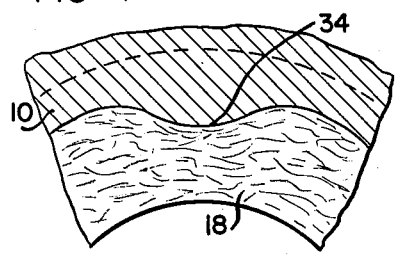
Figure 4 is an enlarged fragmentary view showing a detail of construction of the Figures 1 through 3 element.
Figure 5:
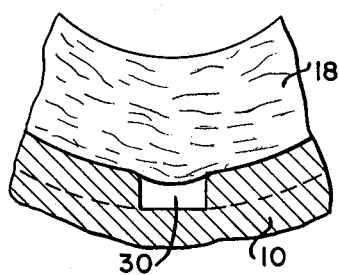
Figure 5 is a view similar to Figure 4 but showing another detail of construction.

Extending along the top of the bearing recess diametrically opposite groove 30, is a rounded rib or projection 34, best seen in Figures 3 and 4. As will be seen in Figure 4, the projection 34 provides for a compressing of the bearing element as it turns beneath the projection while on the opposite side of the bearing recess, when the bearing passes over axial groove 30, there is at least a slight expansion of the bearing element. The net result of the expansion and contraction of the bearing element as it rotates within the bearing recess is to bring about a pumping or breathing action of the porous glass fiber bearing element which pumps lubricant about within the bearing recess so that adequate lubrication of all parts thereof are had at all times, and an extremely efficient cooling of the bearing surface takes place. The element illustrated in Figures 1 through 5 is thus capable of sustaining heavy loads and under conditions of high speeds and will operate for a prolonged time with a minimum amount of lubrication and satisfactory results will be obtained.

Referring to the modification of Figures 6 through 9 a construction somewhat similar to the one already described is illustrated except that in this second modification the glass fiber bearing element 36 remains stationary in the recess 42 while the shaft extension of a rotary member 40 that is journalled therein turns within the bearing.

The bearing recess 42, which is provided in the stationary member 44, is preferably closed by an end cap 46 provided with an oil cup 48 that communicates with the longitudinally extending groove 50 along the bottom of the bearing recess.

The inside of the bearing recess is preferably provided with a spiral groove means 52 similar in function and purpose to the spiral groove means 32 previously described.

For obtaining the pumping and breathing action of the glass fiber bearing, the shaft extension is provided with a plurality of axially or spirally extending arcuate ribs or projections 52 and by virtue of which the glass fiber bearing is alternately compressed and permitted to expand during rotation of the member 40, thereby providing for the said pumping and breathing action previously referred to.

Referring now to Figure 10, there is illustrated a vertical shaft 51 having a reduced diameter extension 53 extending into a bearing recess 54 formed in the stationary member 56.

Whereas the modifications of this invention previously described, provided a resilient and somewhat yielding support for the member journalled therein, the Figure 10 element is adapted for holding the rotary member on a fixed and precise axis of rotation. This would be necessary in the case of many machine elements such as the rotors or armatures of rotating electrical apparatus. In other cases, where the rotating member consisted of a roll, such as in a printing press or a web handling machine, or in certain pieces of agricultural equipment and the like, it would not be necessary to retain the member on a fixed axis of rotation and for members of this nature the modifications of Figures 1 through 9 are adequate.

The Figure 10 element maintains shaft 51 on a fixed axis of rotation by providing the guide rings 58 and 60. Guide ring 58 rests on a shoulder in the bottom of the bearing recess and closely embraces shaft extension 53, whereas guide ring 60 is positioned in a counterbore at the upper end of bearing recess 54 and likewise closely embraces the shaft extension.

Positioned between guide ring 58 and 60 within bearing recess 54 and closely embracing shaft extension 53 is the fiber glass bearing 62 according to my invention.

The upper end of bearing recess 54 is closed by cap 64 in which is mounted an oil cup 66 for supplying oil to the chamber within the closure cap and which chamber is communicated with bearing 62 by means of the axially and radially extending passages 68 as will be seen in the drawing.

Bearing 62 is provided for the purpose not only of insuring adequate lubrication of the shaft extension but also cooling thereof and support therefor. For providing the said support, bearing 62 is preferably in a pre-loaded condition so that instead of the guide rings 58 and 60 sustaining all of the radial loads on the shaft extension, the bearing 62, in normal operation, will sustain a substantial amount of the radial loads thereon.

In Figure 11 the application of my invention as a thrust bearing is illustrated. In this figure the rotary shaft is indicated at 70 and it comprises a reduced diameter extension shaft 72. Shaft extension 72 has its lower end journalled in a sleeve type radial bearing 74 of conventional manufacture and its upper portion extends through the fiber glass thrust bearing 76. Bearing 76 rests on washer 78 at its lower end which is supported on a shoulder in the bearing recess while at the upper end of bearing 76 it is engaged by a washer 80 that engages beneath the shoulder at the bottom end of shaft 70.

The extreme lower end of shaft extension 72 extends into a chamber adapted for being supplied with lubricant. This lubricant is communicated with bearing 76 by the passage means 82 illustrated in the drawing.

In the Figure 11 bearing element 76 provides principally resilient axial support for shaft 70 while at the same time, due to the pumping action of the bearing which will obtain upon axial movement of shaft 70, an adequate supply of lubricant will be pumped about and circulated through the bearing recess thereby insuring adequate lubrication of the rotating parts at all times and an extremely efficient cooling thereof.

Returning for the moment to the modifications of Figures 1 through 9, it may prove advantageous to provide seals at the inner end of the bearing recess to prevent an excess amount of lubrication from being pumped out of the bearing recess by the fiber glass bearing element. This sealing of the bearing recess can readily be accomplished by the provision of a conventional seal mounted in the end of the bearing recess. However, my invention is readily adapted for providing this sealing function merely by impregnating the end of the bearing element at the end of the bearing recess which it is desired to seal with a resilient and flexible but non-porous medium such as rubber, synthetic rubber, or an elastomeric plastic. In Figure 2, for example, the end of the bearing indicated by the additional section lining at 84 might form the seal which will prevent pumping of lubricant from within the bearing recess.

As to the bonding agent employed for the purpose of bonding the individual fibers of the bearing element together at their points of contact, substantially any medium capable of performing this function while still leaving the bearing element porous is suitable. A number of the plastic materials, particularly thermo-setting plastics, such as phenolic materials, are suitable and, in instances where resistance to temperature or to chemical attack is important, a silicone resin may be employed.

For certain purposes, the bearing element may include, at least adjacent the bearing surface proper thereof an anti-friction substance such as graphite or powdered or flake zinc which will effectively reduce the frictional engagement of the bearing element with the adjacent surface but without reducing the porosity thereof.

From the foregoing it will be seen that what is provided by my invention is a novel bearing element constructed of glass fibers, preferably bonded together and stabilized in the manner described by fracturing the fibers that extend at a small angle to the direction of loading of the bearing and either having associated therewith or not a friction reducing additive, especially in the form of finely particulate material of the nature of graphite or powdered zinc.

It will be understood that this invention is capable of modifications in order to adapt it to different usages and, accordingly, it is desired to comprehend within my invention such changes and modifications as may be considered to come within the scope of the appended claims.

I claim:

1. As a new article of manufacture; a bearing element for a rotating member comprising a compressible, resilient, porous body of matted glass fibers which is lubricant permeable.

2. As a new article of manufacture; a bearing element for a rotating member comprising a compressible, resilient, porous body of matted glass fibers which is lubricant permeable, and a bonding agent bonding the fibers together at at least some of the points of contact thereof.

3. As a new article of manufacture; a bearing element for a rotating member comprising a compressible, resilient, porous body of matted glass fibers which is lubricant permeable, and a bonding agent bonding the fibers together at at least some of the points of contact thereof, said fibers being on the order of from 0.00005 to 0.00025 inch in diameter.

4. As a new article of manufacture; a bearing element for a rotating member comprising a compressible, resilient, porous body of matted glass fibers which is lubricant permeable, and a bonding agent bonding the fibers together at at least some of the points of contact thereof, said fibers being on the order of from 0.00005 to 0.00025 inch in diameter, and with the fibers extending at only a small angle to the direction of the applied load being fractured.

5. As a new article of manufacture; a bearing element for a rotating member comprising a porous resilient sleeve consisting of matted glass fibers bonded together at at least some of the points of contact thereof, and a friction reducing additive in at least the surface of the bearing that is subjected to sliding friction.

6. In combination; a rotary member having a journal pin, a stationary member having a cylindrical bearing recess, and a bearing sleeve of matted and bonded together glass fibers in said recess surrounding said pin, and means for causing repetitive compressing and expanding of the bearing sleeve during rotation of said rotary member.

7. In combination; a rotary member having a journal pin, a stationary member having a bearing recess, and a bearing sleeve of matted and bonded together glass fibers in said recess surrounding said pin, said sleeve being secured to said pin to rotate therewith, and an axially extending arcuate protuberance extending along said recess so the bearing will be attenuately compressed and expanded during rotation to provide for a breathing or pumping action.

8. In combination; a rotary member having a journal pin, a stationary member having a bearing recess, and a bearing sleeve of matted and bonded together glass fibers in said recess surrounding said pin, said sleeve being secured to said pin to rotate therewith, and an axially extending arcuate protuberance extending along said recess so the bearing will be alternately compressed and expanded during rotation to provide for a breathing or pumping action, said recess also having an axial groove therein opposite said protuberance, and means for supplying lubricants to said groove.

9. In combination; a rotary member having a journal pin, a stationary member having a bearing recess, and a bearing sleeve of matted and bonded together glass fibers in said recess surrounding said pin, said sleeve being secured to said pin to rotate therewith, and an axially extending arcuate protuberance extending along said recess so the bearing will be alternately compressed and expanded during rotation to provide for a breathing or pumping action, said recess also having an axial groove therein opposite said protuberance, and means for supplying lubricants to said groove, there being a spiral groove about the inside of the recess intersecting said axial groove.

10. In combination; a rotary shaft, a stationary member having a bearing recess into which the shaft extends, a porous fiber glass bearing element in the recess around the shaft, a closure cap closing one end of the recess, groove means in the recess for receiving lubricant for the bearing element, means for alternately compressing and expanding said element during rotation of said shaft whereby said element pumps oil about said recess, and means sealing between the shaft and recess at the end opposite said closure cap.

11. In combination; a rotary shaft, a stationary member having a bearing recess into which the shaft extends, a porous fiber glass bearing element in the recess around the shaft, a closure cap closing one end of the recess, groove means in the recess for receiving lubricant for the bearing element, means for alternately compressing and expanding said element during rotation of said shaft whereby said element pumps oil about said recess, and means sealing between the shaft and recess at the end opposite said closure cap, said last mentioned means comprising a resilient but non-porous impregnant in the end of the bearing element.

12. In combination; a rotary member having a journal pin, a stationary member having a cylindrical bearing recess, and a bearing sleeve of matted and bonded together glass fibers in said recess surrounding said pin, and means for causing repetitive compressing and expanding of the bearing sleeve during rotation of said rotary member, said means comprising raised portion on said journal pin, and there being lubricant in said recess whereby the repetitive compressing and expanding of said sleeve causes it to pump the lubricant about in the recess.

13. In combination; a rotary member having a journal pin, a stationary member having a cylindrical bearing recess, and a bearing sleeve of matted and bonded together glass fibers in said recess surrounding said pin, and an annular guide ring in the recess engaging said journal pin to hold the rotary member on a fixed axis.

14. In combination; a rotary member having a journal pin, a stationary member having a cylindrical bearing recess, and a bearing sleeve of matted and bonded together glass fibers in said recess surrounding said pin, and annular guide rings in the recess on opposite sides of said sleeve engaging said journal pin to hold the rotary member on a fixed axis.

15. In combination; a rotary member having a journal pin, a stationary member having a cylindrical bearing recess, and a bearing sleeve of matted and bonded together glass fibers in said recess surrounding said pin, and annular guide rings in the recess on opposite sides of said sleeve engaging said journal pin to hold the rotary member on a fixed axis, there being a lubricant reservoir at the end of the journal pin, and said pin having a channel leading from the reservoir to the sleeve.

16. In combination; a rotary member, a stationary member, a bearing sleeve in the stationary member supporting the rotary member, a sleeve of matted and bonded together glass fibers surrounding said rotary member adjacent the bearing sleeve, and thrust collars at opposite ends of said glass fiber sleeve one supported on the stationary member and the other abutting said rotary member whereby the glass fiber bearing acts as a thrust bearing.

17. In combination; a rotary member, a stationary member, a bearing sleeve in the stationary member supporting the rotary member, a sleeve of matted and bonded together glass fibers surrounding said rotary member adjacent the bearing sleeve, and thrust collars at opposite ends of said glass fiber sleeve one supported on the stationary member and the other abutting said rotary member whereby the glass fiber bearing acts as a thrust bearing, the end of the rotary member extending into a lubricant reservoir and a channel in the rotary member leading from the reservoir to the glass fiber sleeve.

18. In the art of journalling rotary members; the steps of supporting an externally ribbed rotatable member on a bearing element comprising a porous and resilient mat of glass fibers, and flowing a lubricant supply into contact with the glass fibers while rotating the ribbed member whereby, by contact of the ribbed member with the resilient mat of fibers, the lubricant will be pumped and circulated through the mat of glass fibers.

19. In the art of journaling rotary members, the steps of supporting a rotatable member on a bearing element comprising a porous and resilient mat of glass fibers, flowing a lubricant supply into communication with the glass fibers, and repetitively compressing and expanding the mat of fibers during rotation of said member to pump and circulate the lubricant through the glass fibers.

20. In a bearing and rotatable shaft assembly, said shaft having a load bearing portion, the improvement of a compressible, resilient, porous body of glass fibers, said body being adapted to surround the load-bearing portion of said shaft, and said body having a capacity of lubricant circulation therethrough upon compression and expansion thereof, means for repetitively compressing and allowing expansion of said body, and means for supplying lubricant to said body.

References Cited in the file of this patent

UNITED STATES PATENTS

| | | |
|---|---|---|
| 2,219,054 | Palm | Oct. 22, 1940 |
| 2,571,235 | Hamer | Oct. 16, 1951 |
| 2,600,843 | Bush | June 17, 1952 |